United States Patent
Akerlund et al.

(10) Patent No.: US 8,213,202 B2
(45) Date of Patent: Jul. 3, 2012

(54) ENERGY DISTRIBUTING CIRCUIT ARRANGEMENT, INCLUDING A DC/DC-CONVERTER

(76) Inventors: John Akerlund, Lindingo (SE); Jan Ottoson, Skarholmen (SE)

( * ) Notice: Subject to any disclaimer, the term of this patent is extended or adjusted under 35 U.S.C. 154(b) by 697 days.

(21) Appl. No.: 12/301,310

(22) PCT Filed: May 22, 2007

(86) PCT No.: PCT/SE2007/050343
§ 371 (c)(1),
(2), (4) Date: Nov. 18, 2008

(87) PCT Pub. No.: WO2007/136345
PCT Pub. Date: Nov. 29, 2007

(65) Prior Publication Data
US 2009/0122584 A1   May 14, 2009

(30) Foreign Application Priority Data

May 24, 2006 (SE) .................... 0601161
May 24, 2006 (SE) .................... 0601162

(51) Int. Cl.
H02M 7/06 (2006.01)
H02J 7/04 (2006.01)
(52) U.S. Cl. ................... 363/126; 320/135
(58) Field of Classification Search ............ 363/17, 363/56.02, 97, 98, 126, 132, 52; 318/139, 318/25.4, 254.2; 320/135
See application file for complete search history.

(56) References Cited

U.S. PATENT DOCUMENTS 6,002,220 A * 12/1999 Takahashi et al. ............ 318/139
6,297,616 B1 * 10/2001 Kubo et al. ............ 320/116
(Continued)

FOREIGN PATENT DOCUMENTS
EP 0 170 932 2/1986
(Continued)

OTHER PUBLICATIONS

Abstract of JP 08126314.
(Continued)

*Primary Examiner* — Adolf Berhane
(74) *Attorney, Agent, or Firm* — Frost Brown Todd LLC

(57) ABSTRACT

The present invention relates to a current distributing circuit arrangement (20, 20'), adapted for charging a plurality of arrays of co-ordinated energy supplying DC-networks ("A" (DC)), ("B" (DC)), wherein the circuit arrangement (20) includes a plurality of setup-related circuits (21, 22, 23, 24) each of which is adapted to a pre selected energy supplying DC-network, ("A" (DC)) with, inter alia, its allocated terminal voltage (350V DC), its allocated capacity and/or its allocated maximized loading current. Respective circuit arrangements (20, 20') can be allocated an AC-supplied rectifying bridge (21), an after-coupled sinus pump unit (23) and a DC/DC-converter (24) that includes a maximum current limiting circuit (43). A conductor (25) required for a first circuit (20) may be related to earth system (2q) and coupled electrically (61) to a conductor (25') required for a second circuit (20') and related to said earth system (2q), wherein said earth system (2q) is connected directly to the rectifying bridge (21) supplied with an alternating current. The circuit arrangement (20) includes a DC/DC-converter (24), constructed of solely a few components, and an energy storage circuit, which is related to a sinus pump unit, a SP-unit, and which has the form of a capacitor (40) adapted for a high capacitance value and/or for a high voltage valve (420V DC).

14 Claims, 7 Drawing Sheets

U.S. PATENT DOCUMENTS

2005/0052165 A1    3/2005    Willner et al.

FOREIGN PATENT DOCUMENTS

| | | |
|---|---|---|
| EP | 0 582 183 | 2/1994 |
| EP | 1 020 973 | 7/2000 |
| EP | 1 381 135 | 1/2004 |
| JP | 08126314 | 5/1996 |
| JP | 10117448 | 5/1998 |

OTHER PUBLICATIONS

Abstract of JP 10117448.

International Preliminary Report on Patentability dated Aug. 22, 2008 for Application No. PCT/SE2007/050343.

International Search Report dated Sep. 7, 2007 for Application No. PCT/SE2007/050343.

* cited by examiner

ENERGY DISTRIBUTING CIRCUIT ARRANGEMENT, INCLUDING A DC/DC-CONVERTER

TECHNICAL FIELD

The present invention relates to a power and energy distributing and/or a power and energy delivering circuit arrangement, which is hereinafter referred to solely as a "circuit arrangement", and more particularly to a circuit arrangement for creating, from a power and energy distributing network, a primary energy supplied DC-network and a secondary energy supplying DC-network.

The supplying network, intended for the power and energy distributing circuit arrangement, may then be comprised of an alternating current network (an AC-network) or a direct current network (DC-network) or another direct current source, with the circuit arrangement adapted for a power and energy distribution to said energy supplied DC-network.

More particularly, the present invention has as its starting point a bridge coupling, associated with the circuit arrangement, so that, when necessary, a parallel coupling function can be created between a first and a second circuit arrangement having an associated or co-ordinated DC-network.

The circuit arrangement is intended to afford general use within different technical applications and fields with respect to the ability of maintaining the direct voltage level of the energy supplied DC-network constant with the aid of simplified coupling-technical circuit solutions and with the aid of only few components.

The circuit arrangement is thus intended for special application within an AC/DC-network and within a DC/DC-network, where high demands are placed on the ability of the energy-supplied DC network to give a constant DC-voltage under different load conditions, even when the energy distributing network delivers varying AC-voltages or DC-voltages, for instance so-called voltage dips, i.e. when the supply voltage includes short time periods during which there is no supply voltage or during which the supply voltage is reduced. Unfortunately, this phenomenon has not been found too unusual, particularly in the case of an energy distributing AC-network.

The application of such circuit arrangements that are adapted for charging one or more arrays of co-ordinated batteries also lies within the scope of the present invention, these batteries being able to serve as a back-up function for an energy supplied DC-network that is used.

Circuit arrangements of this kind will also include a plurality of installation circuits, each being adapted to a pre-selected energy-supplied DC-network with or without a battery back-up function.

With respect to an energy-supplied DC-network, supported by an array of batteries, the circuit arrangement required for supplying the DC-network may be designated a "charging circuit".

The scope of the present invention also allows a plurality of parallel-related current distribution circuit arrangements with an energy supplied DC-network or DC source, with or without battery arrays for maintaining a constant voltage level, where each of the DC-networks may be allotted a respective terminal voltage, a respective capacity and/or a respective loading current and/or loading structure.

The supplied DC-network may be structured in different ways and for different purposes and therewith requires adaptation of the current distributing circuit arrangement. It is obvious that a DC-network that is intended to maintain the level of charge of one or more batteries for periodically strong or high currents, such as starting batteries and a DC-network intended for maintaining the charge levels for one or more batteries intended for a more continuous current distribution, requires different circuit structures for the current distributing circuit arrangement used.

More specifically a current distributing circuit arrangement of this kind may be based on an energy-supplied bridge coupling, such as an AC-supplied DC bridge, an after-coupled sinus pump unit designated (SP-unit) and a DC/DC-converter, which may also include a power and/or energy regulating circuit with a current limiting circuit, for keeping the power values and current values within and beneath maximized limit values.

The present invention is thus intended to utilize a sinus pump unit, hereinafter abbreviated to "SP-unit", between the bridge coupling and the DC/DC-converter.

By "SP-unit" is meant primarily a principally known arrangement where a variation in the curve shape of an AC-current in time shall be imaged against a curve shape and phase position of an input voltage, so that a supplying AC-network will be able to determine a chosen load from such a circuit arrangement, and an energy supplied DC-network will view a chosen load as a "purely resistive load" with only a small or no phase shift.

BACKGROUND OF THE INVENTION

Several different designs of methods, arrangements and constructions related to the technical field mentioned above including a current distribution circuit arrangement with an associated energy distributing DC-network for creating an energy supplied DC-network, by which the DC voltage level is held constant.

Direct current circuits shall not solely be designed so as to obtain a constant DC-voltage more or less independently of the load at that moment via an SP-unit and an after-coupled DC/DC-converter, but may also be adapted to compensate for occurring voltage variations, such as voltage dips or brief voltage shortfalls in the AC-network or DC-network distributing energy to the circuit arrangement.

One embodiment considered to lie close to known technology in this technical field is illustrated and described below with reference to FIG. 1 and FIG. 2, where an earlier known supply circuit or charging circuit is illustrated in a coupling technical fashion with an AC/DC-converter that includes a rectifying bridge, that includes four full-wave-rectifying diodes or diode assemblies, an SP-unit, a DC/AC-converter, a circuit isolating transformer, and an AC/DC-converter for supplying a DC-network to which energy shall be distributed.

FIG. 1 is intended to describe briefly two or more parallel related energy distributing DC-networks of mutually the same type, having associated energy or power distributing circuit arrangements.

FIG. 2 illustrates in more detail the coupling, technical construction of each of the separately supplied circuit arrangements shown in FIG. 1, from which it will be seen that the parallel coupling, illustrated in FIG. 1, is comprised of an electrically isolated circuit arrangement via the transformer couplings used.

In respect of an energy distributing AC-network (or DC-network) to a known circuit arrangement of the construction shown in FIG. 2 it is known that the creation of an energy-supplied DC-network, with a DC-voltage that is kept constant, suffers different drawbacks and challenges, dependent on different circumstances.

A first drawback or challenge in respect of prior art circuit arrangements is that in order to function satisfactorily they require a large number of components, among other things in the form of program controlled transistors which shall create within the circuit arrangement from a created DC-voltage zero transits for an internally generated AC-current or an AC-voltage that can be coupled alternately to a requisite transformer and after-coupled rectifying units for forming a DC-network, and those skilled in this particular art have a pronounced need to be able to create the same functions with the hope of being able to utilize far fewer components with lower circuit-internal power losses.

Another drawback or challenge is concerned with the ability to maintain a voltage-constant energy-supplied DC-network to a connected customer circuit, even when the energy distributing AC-network (or DC-network) is subjected to profound voltage dips, voltage increases and/or short-term breakdowns.

A third drawback or challenge resides in the ability to couple a plurality of energy supplied DC-networks in parallel and to utilize in this parallel coupling one and the same electric conductor, that shall be related to a common point or reference point.

The present invention provides primarily means for solving this third challenge.

The contents of the patent publications listed below do belong to the earlier standpoints of techniques:
EP-A1-0170932,
US-A1-2005/0 052 165,
EP-A1-1 381 135, and
EP-A2-0 582 183

Patent publication EP-A1-0 170 932 illustrates and describes a coupling arrangement for distributing rectified electric energy to one or more consumers and can be considered to teach the basic conditions of the present invention in this regard.

The patent publication thus teaches a series coupling of an SP-unit and a DC/DC-converter.

FIG. 3 of said patent publication clarifies the use of a voltage (340 V), that can be adjusted to a fixed state, and a voltage converter (8).

The voltage converter (8) is illustrated in FIG. 3 as a transformer (82) that has separate and therewith electrically isolated primary and secondary windings, where the primary winding is controlled by a field effect transistor (81) and conforms to the technique illustrated and described with reference to the coupling arrangements according to FIG. 2 of the present application.

Patent publication US-A1-2005/0 052 165 illustrates and describes an arrangement for creating distribution of converted electric energy to a load, where said conversion is based on a DC-converter, and where measures have been taken to optimize its efficiency.

There is described to this end the use of an impedance in a voltage converting or voltage transforming circuit.

FIG. 5 of said patent publication also clarifies that a conductor extending through the circuit includes a series-connected inductance (1-8), wherewith such a coupling would completely jeopardize and, in practice, make the parallel related coupling significant to the present invention totally impossible to achieve.

Patent publication EP-A1-1 381 135 describes a battery powered electronic circuit arrangement and is intended to compensate and control a voltage level when an output voltage from a battery (201) lies beneath the voltage level required for coupling a load to the circuit arrangement. This publication relates to a coupling arrangement that enables voltage to be increased or lowered.

Finally, patent publication EP-A2-0 582813 illustrates and describes a coupling arrangement which is constructed to afford high power factors and a low harmonic distortion, with the aid of FET-transistors and/or MOSFET-transistors and with an electrically insulated or isolated DC/DC-converter in respect of load connected to the coupling arrangement.

SUMMARY OF THE PRESENT INVENTION

Technical Problems

When taking into consideration the technical deliberations that a person of average skill in this particular art must make in order to provide a solution to one or more technical problems that he/she encounters it will be necessary initially to be aware of those measures or sequence of measures that must be taken, including the necessary selection of the means that will be required on the basis of this awareness and against this background the subsequent technical problems may be relevant in realizing the object of the present invention.

When considering the present state of the art as described above and as illustrated more specifically in FIGS. 1 and 2 of the accompanying drawings, it will be seen that a technical problem resides in realizing the significance of and the advantages afforded by and/or the technical measures and considerations that will be required in creating with each bridge coupling a parallel coupling function between a first circuit arrangement and a second circuit arrangement, so as to be able to create one or more parallel related energy supplied DC-networks where exhaustive measures have been taken to overcome the aforesaid challenges or drawbacks.

A further technical problem resides in the ability to realize the significance of, the benefits afforded by and/or the technical measures and deliberations that will be required in allowing an electric cable or conductor connected to the bridge coupling to extend to and be included as one of the conductors for one or more parallel related DC-networks in the absence of a series coupling and/or a parallel coupling of one or more discrete components, via said SP-unit and said DC/DC-converter, where said conductor shall also be connected directly to a common point, a reference point, such as an earthing point.

Another technical problem resides in the ability to realize the significance of, the benefits afforded by and/or the technical measures and deliberations that will be required in respect of an AC-supplied bridge coupling to allow a rectifier bridge, that includes a diode or co-ordinated diodes, to be connected directly to said conductor.

Another technical problem resides in the ability to realize the significance of, the benefits afforded by and/or the technical measures and deliberations that will be required in allowing a capacitor, included in said SP-unit, to be dimensioned for a selected energy content that is sufficiently large to compensate energy-wise for short voltage dips and/or briefly occurring voltage losses occurring in the energy supplying network connected to said bridge coupling while maintaining a selected DC-level constant for the connected energy supplied DC-network.

A technical problem also resides in the ability to realize the significance of, the benefits afforded by and/or the technical measures and deliberations that will be required in allowing the DC/DC-converter to include a controllable transistor coupling, at least a diode and a series connected inductance in a transistor in the transistor coupling.

Another technical problem resides in the ability to realize the significance of, the benefits afforded by and/or the technical measures and deliberations that will be required in enabling the creation of such a coupling technical circuit arrangement that includes one or more programmed control transistors, where a requisite DC/DC-converter can be connected directly to the DC-network and can also be structured with a few components in relation to prior art technology.

A technical problem also resides in the ability to realize the significance of and the benefits associated with and/or the technical measures and deliberations that will be required in order to allow the use of a capacitor, whose capacitance value and/or its ability to store energy is especially adapted to conform to the formula ($\frac{1}{2}C\,U^2$).

A further technical problem resides in the ability to realize the significance of, the benefits afforded by and/or the technical measures and deliberations that will be required in allowing the capacitor to be given a capacitance value, corresponding to an energy content which is able to compensate for the maximized energy requirement of the DC-network (Nout) over a predetermined short duration of time, for instance a time duration of up to 200 ms.

A technical problem also resides in the ability to realize the significance of, the benefits afforded by and/or the technical measures and deliberations that will be required in allowing a desired increase of a chosen energy content within the capacitor to be achieved either via a selected increase in the capacitance value of the capacitor and/or via a chosen increase in the DC-voltage across the capacitor.

Another technical problem resides in the ability to realize the significance of, the benefits associated with and/or the technical measures and deliberations that will be required in enabling a DC/DC-converter to include a circuit for a pulse-width modulation of a controlled transistor, adapted for said direct current.

Another technical problem resides in the ability to realize the significance of, the benefits associated with and/or the technical measures and deliberations that will be required in allowing the use of a controllable transistor, such as a MOSFET-transistor, wherewith the transistor shall be controllable in a known manner via a control circuit, adapted with regard to a chosen inductance.

Another technical problem resides in the ability to realize the significance of, the benefits afforded by and/or the technical measures and deliberations that will be required in allowing the use of a non-insulating DC/DC-converter, thus no transformer with separate or electrically isolated primary and secondary windings between the SP-unit and the DC-network.

Another technical problem resides in the ability to realize the significance of, the benefits afforded by and/or the technical measures and deliberations that will be required in permitting a continuous conductor included in the rectifying bridge in the AC/DC-converter to be connected to a supply voltage or to a common point or to a reference point, such as a zero-conductor to the DC-network related output conductor or to a minus potential.

A technical problem also resides in the ability to realize the significance of, the benefits afforded by and/or the technical measures and deliberations that will be required in providing means for creating a high DC-related voltage for the SP-unit when necessary.

Another technical problem resides in the ability to realize the significance of, the benefits afforded by and/or the technical measures and deliberations that will be required in permitting such a capacitor to be dimensioned with a relatively large capacitance value (and large volume) or with a relatively smaller capacitance value (and smaller volume) and/or utilizing a relatively high voltage ($V^2$).

Another technical problem resides in the ability to realize the significance of, the advantages benefited by and/or the technical measures and deliberations that will be required in co-ordinating one or more energy storing circuits in addition to said capacitor with an SP-unit wherewith it shall be possible to adapt the storage of energy so as to cover a voltage shortfall, e.g. of 200 ms with respect to the energy distributing AC-network (or DC-network).

A technical problem also resides in the ability to realize the significance of, the advantages afforded by and/or the technical measures and deliberations that will be required in greatly simplifying the circuit structure of a DC/DC-converter assigned to the circuit arrangement, in combination with allowing energy compensation for short voltage dips and/or brief voltage declines in the energy distributing AC or DC network.

A technical problem also resides in the ability to realize the significance of and the benefits associated with and/or the technical measures and deliberations that will be required in allowing each of the circuit arrangements to be adapted to enable them to be coupled in parallel and to be constructively co-ordinated so that each is able to supply its and/or co-ordinated energy supplying DC-network with different performances.

A technical problem also resides in the ability to realize the significance of, the benefits associated with and/or the technical measures and deliberations that will be required in permitting only one single DC-network to be supplied and/or in permitting one or more arrays of co-ordinated batteries within a DC-network to be charged, wherewith said circuit arrangements will have one available positive terminal and can provide common use of a system earthed conductor, normally a conductor that has a minus potential.

A technical problem also resides in the ability to realize the significance of, the benefits associated with and/or the technical measures and deliberations that will be required in allowing a conductor required for one circuit arrangement to be related to system earth and galvanic connected to a conductor required for the second circuit arrangement and related to system earth, and thereby enable the creation of conditions for allowing a plurality of such circuit arrangements to be co-ordinated in parallel and structured individually in a single physical unit with a common supply to all circuit arrangements or to selected circuit arrangements and/or energy-supplied DC-networks.

Another technical problem resides in the ability to realize the significance of, the benefits afforded by and/or the technical measures and deliberations that will be required in allowing a capacitor, included in an SP-unit, to be given a low capacitance and a small volume and therewith inexpensive to purchase, so as to allow the creation of conditions for a lower input surge of current or charging current, where the value of the capacitor is chosen so as to be in relation to expected brief voltage dips and/or short voltage declines.

Another technical problem resides in the ability to realize the significance of, the benefits afforded by and/or the technical measures and deliberations that will be required in allowing only one MOSFET-transistor arrangement to be controlled so that the power produced is regulated via a pulse-width modulation of the supplying DC-current in the DC network.

A technical problem also resides in the ability to realize the significance of, the benefits afforded by and/or the technical measures and deliberations that will be required in allowing an adapted DC/DC-converter to include a series connected and computer controlled MOSFET-transistor.

Another technical problem resides in the ability to realize the significance of, the benefits afforded by and/or the technical measures and deliberations that will be required in allowing a single MOSFET-transistor to be connected in series with an inductance, with the aim of maintaining the voltage constant in the energy-supplied DC-network.

Solution

The present invention takes as its starting point the known technology, defined in the introduction with respect to a current distributing and/or a battery charging circuit arrangement.

In this regard the invention is based on a current distributing circuit arrangement that can be connected to an energy distributing network with which there is co-ordinated an AC-bridge coupling or a DC-supplied bridge coupling, an after-coupled sinus pump unit or SP-unit and a DC/DC-converter adapted to allow current or voltage to be supplied to a DC-network assigned to the circuit arrangement and/or to charge one or more arrays of co-ordinated batteries assigned to the DC network, where said circuit arrangement with its DC/DC-converter is adapted to a predetermined selected load setup with, inter alia, its allotted DC-voltage, its allotted capacity and/or its allotted loading current.

With the intention of solving one or more of the technical problems listed above the present invention proposes in particular that the above described known technology of a circuit arrangement shall be capable of being supplemented by means of an electric conductor or conductor means, connected to the bridge coupling, in the absence of a series coupling and/or a parallel coupling of one or more discrete components via said SP-unit and said DC/DC-converter which is arranged to extend to and be included as one of the conductors for the DC-network, wherein said conductor is connected directly to a common point, a reference point, such as an earthing point.

It is proposed, in accordance with the invention by way of suggested embodiments that in the case of an AC-supplied bridge coupling a diode, included in a rectifying bridge, alternatively co-ordinated diodes, is/are connected to said conductor.

It is also proposed, by way of preferred embodiments of the present invention, that a capacitor included in said SP-unit shall be dimensioned for an energy content that is sufficient to compensate energy-wise for short voltage dips and/or for briefly occurring voltage lapses occurring within the energy distributing network connected to the bridge coupling for maintaining a constant selected DC-level for a connected energy supplied DC network.

Also proposed, in accordance with the present invention, are embodiments in which the DC/DC-converter conveniently includes a controllable transistor coupling, at least a diode and an inductance which is series connected to a transistor included in the transistor coupling.

The capacitor shall be given a capacitance that corresponds to an energy content that is able to compensate for the maximized energy requirement of the DC-network (Nout) over a predetermined duration of time, for instance a time span of up to 200 ms.

This enables a chosen energy content within the capacitor to be increased via a chosen increase in its capacitance value and/or via a chosen increase in the DC-voltage across the capacitor.

A chosen DC/DC-converter may conveniently include a transistor, adapted for pulse-width modulation of a DC-current.

A first conductor, included in a first circuit arrangement is, related to an earth system and is connected galvanically to a second conductor which is included in a second circuit arrangement and which is also related to an earth system, wherein the earth system is connected directly to the bridge coupling assigned to its circuit arrangement so as to enable therewith the creation of a parallel coupling function between the first and the second circuit arrangements and the first and second DC-networks assigned to said circuit arrangements. The circuit arrangements are supplied in parallel from one and the same energy supplying network, such as via an alternating current supply network or a direct current supply network.

All of the rectifying units, included in one and the same rectifying bridge for respective circuit arrangements, are dimensioned to allow them to be coupled in parallel.

The DC-network shall include one or more battery arrays for maintaining a constant DC-voltage, wherein a capacitor, included in the SP-unit, is adapted to have a low capacitance value such as to create conditions for a low input current surge or battery charging current, and a small volume so as to enable the creation of conditions, primarily via one or more battery arrays, for compensating for higher energy requirements in the DC-network for instance in the case of longer voltage emissions from the energy supplying network.

The scope of the present invention also covers a current distributing circuit arrangement which is adapted for supplying an energy supplied DC-network and/or for charging one or more arrays of co-ordinated batteries in the energy supplied DC-network, wherein the circuit arrangement may also include a circuit for distributing energy to the energy supplied DC-circuit in the form of a DC/DC-converter adapted for a pre-selected load setting, including, inter alia, its allotted terminal voltage, its allotted capacity and/or its allotted loading current, with respective circuit arrangements being assigned a sinus pump unit or SP-unit and being series coupled to said DC/DC-converter, wherein the DC/DC-converter shall include a series coupled computer controlled MOSFET-transistor for current regulation and/or current limitation to said DC-network (Nout).

A number of similar or at least generally similar circuit arrangements shall, in this case, be capable of being coupled in parallel and connected to a reference point, such as an earthing point (a connecting point for system earth). A single MOSFET-transistor included in a DC/DC-converter shall be connected with an inductance against the DC network (?).

Benefits Advantages

The primary benefits that can be considered characteristic of the present invention and the particular characteristic features significant of said invention reside in the ability to create conditions with which an energy supplied DC-network and/or a battery charging circuit arrangement which is adapted for the parallel supply of a plurality of co-ordinated energy supplied DC-networks and/or batteries to create setup-related circuits where each of said circuits is adapted to a pre-selected DC-voltage for supplying one or more co-ordinated DC-networks and/or batteries independently of one another, among other things as a result of a conductor or conductor means required for a first circuit being related to earth system and connected electrically to the conductor which is required for the second circuit and which is also related to system earth, etc.

The invention also illustrates a simplified coupling diagram for a non-isolating circuit arrangement, where, inter alia, a system differing or separating and isolating transformer unit which can be coupled in parallel has been omitted.

The circuit arrangement, according to the present invention, also enables the creation of circuits for a DC/DC-converter to be constructed with fewer components than in the case of earlier known technology. In addition, the invention does not require the presence of a transformer unit between a DC/DC-converter assigned to the circuit arrangement and a rectifying bridge in order to form or create the DC current or DC voltage required for the energy supplying DC-network.

The primary characteristic features of the present invention are set forth in the characterising clause of the accompanying claim 1.

BRIEF DESCRIPTION OF THE DRAWINGS

An earlier known energy supplied DC-network, that includes a battery charging circuit arrangement, and an embodiment at present proposed, that includes features significant of the present invention, will now be described in more detail by way of example and with reference to the accompanying drawing, in which.

DESCRIPTION OF THE KNOWN TECHNOLOGY ILLUSTRATED IN FIGS. 1 AND 2

Figure 1:
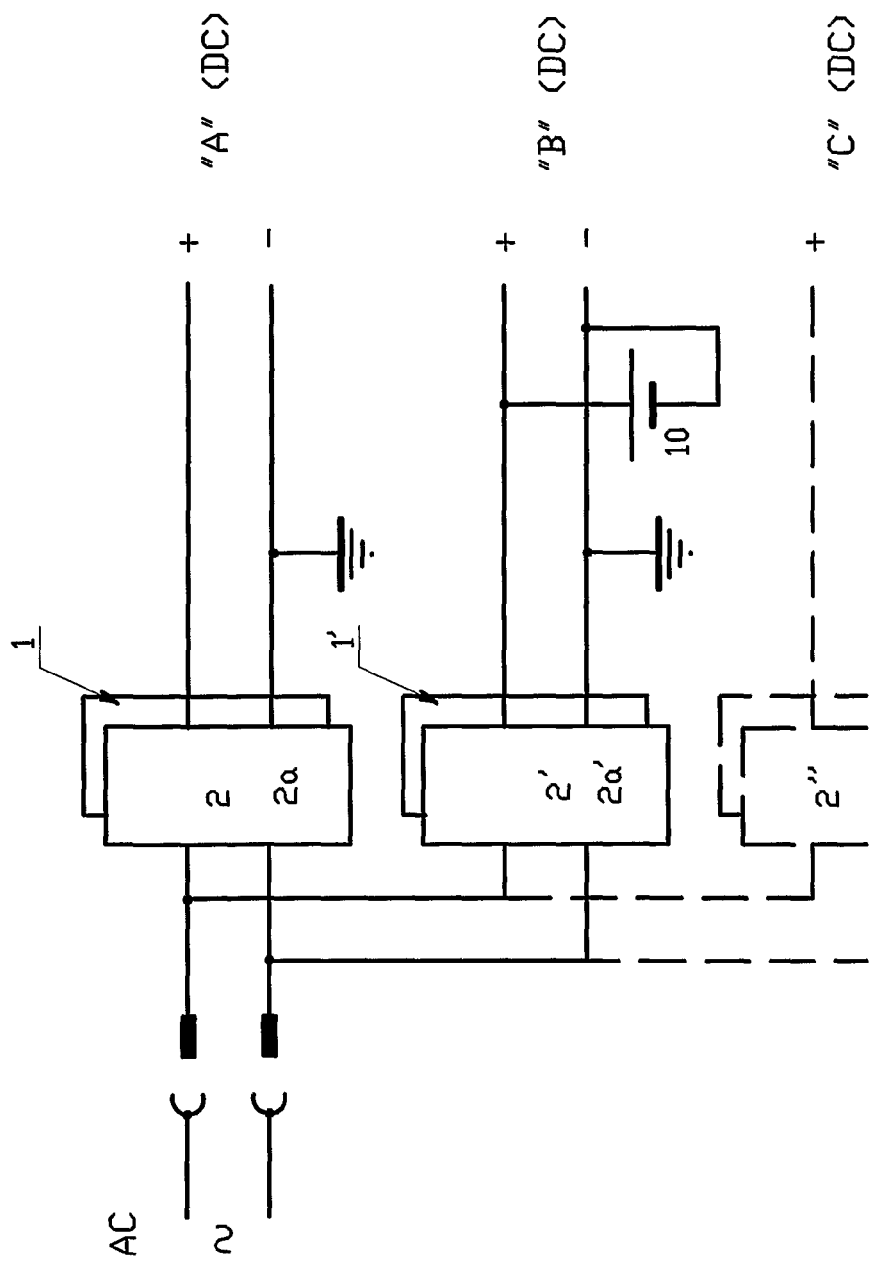
FIG. 1 illustrates a simplified circuit diagram of a known energy supplied DC-network which includes a current distributing and/or battery charging circuit arrangement, where the individual units are adapted for supplying in parallel a plurality of arrays of co-ordinated energy supplied DC-networks with the aid of a plurality of setup-related and unit internal complete circuits.

FIG. 1 thus illustrates a current distributing circuit arrangement 1 for distributing current to one or more energy supplied DC-networks A; (DC) and B; (DC) wherewith respective DC-networks can be provided with a voltage backup with the aid of an illustrated array of batteries 10.

The figure illustrates the use of two units of current distributing circuit arrangements 2, 2' each of which is adapted to distribute current to a respective DC-network A (DC) and B (DC) in parallel and to charge a plurality of arrays of co-ordinated batteries 10, where a first group has been designated "A" (DC) while a second group has been designed "B" (DC) wherein respective groups are each included in a respective energy supplied DC-network, "A"-network and "B"-network respectively.

The circuit arrangements 2, 2' include a plurality of setup-related supply and/or charging circuits referenced 2a, 2a', where each circuit is related to its unit 2, 2'. Each of the charging circuits 2a, 2a' is adapted directly to a pre-selected DC network, "A" (DC) and "B" (DC), and therewith a chosen load exemplified by the battery array 10. Each of the DC networks with its associated battery array 10 or the network "B" (DC) or in the absence of such a circuit for maintaining the DC-voltage of the network "A" (DC) constant is, inter alia, allotted a terminal voltage, allotted its capacity and/or adapted to its allotted loading current and/or expected time division and will thereby require different dimensioning criteria in respect of the circuit 2a and in respect of the circuit 2a'. This enables the battery array 10 and the DC-networks to be allotted totally different criteria or conditions.

Figure 2:
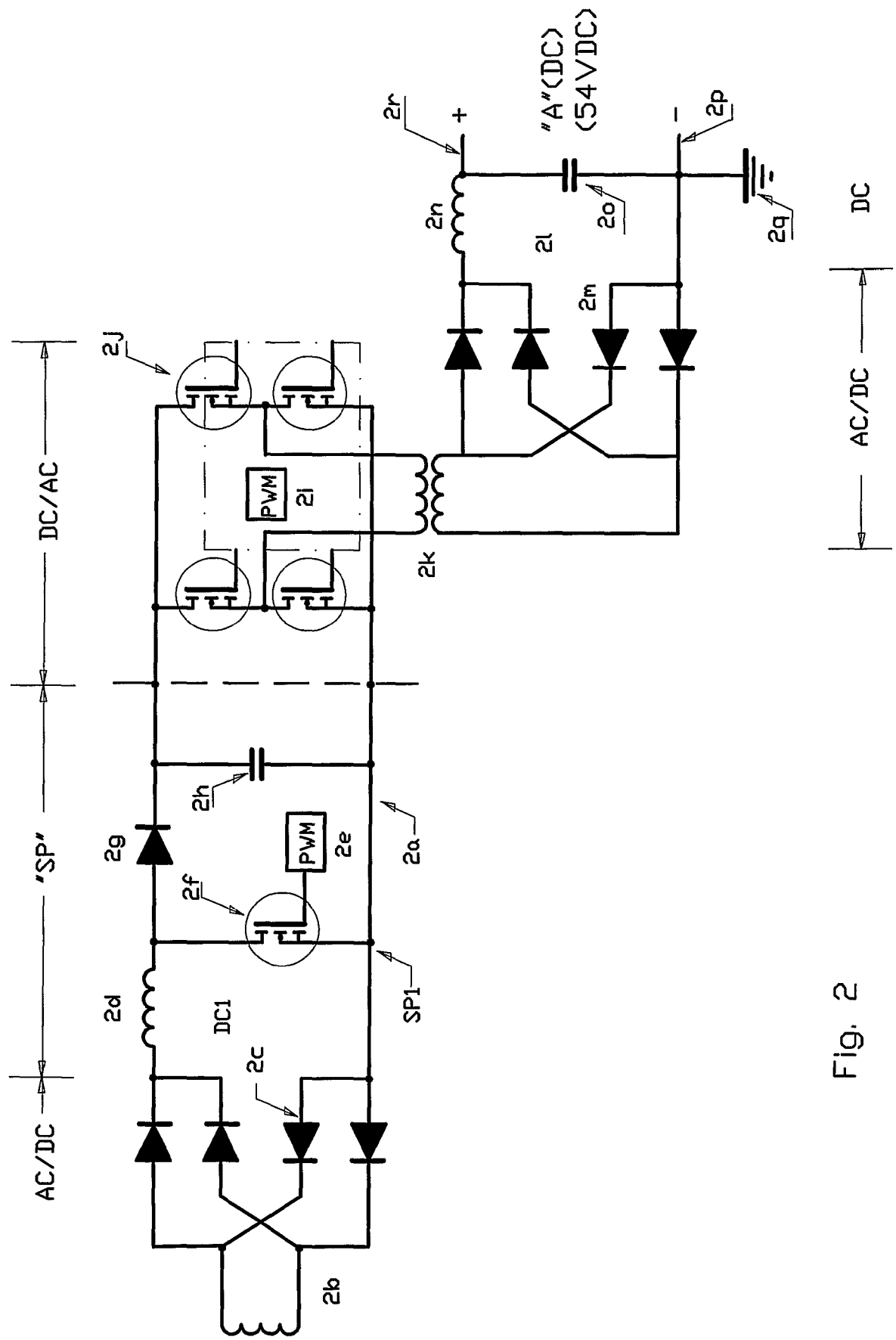
FIG. 2 is a circuit diagram illustrating an earlier known current distributing circuit arrangement in each of the two units illustrated in the embodiment shown in FIG. 1.

An earlier known current distributing circuit arrangement 2, 2' in the form of a supplying or charging circuit is illustrated and described more specifically in FIG. 2, where a circuit 2a is identical to a circuit 2a' although with the circuit components having been given different values, so as to be able to respond to chosen criteria for the chosen DC-network. Accordingly, for the sake of simplification the circuit arrangement, shown in FIG. 2, is related to the circuit 2a, although with the knowledge that the same circuit construction can be applied for the circuit 2a'.

The circuit 2a is comprised of an AC-supplied bridge coupling 2b, that has a rectifying bridge 2c for generating a DC-voltage, DC 1, supplied to an SP-unit that includes an inductance 2d, a controllable 2e transistor 2f, a diode 2g and a capacitor 2h. The SP-unit, SP1, is connected to a DC/AC-converter that has four controllable transistors 2j, which are connected to a circuit isolating transformer 2k via a circuit 2i.

The secondary winding of the transformer 2k is connected to an AC/DC-converter 21 with four diodes 2m and a following filter circuit that includes an inductance 2n and a capacitance for building a DC-network "A" (DC).

FIG. 2 also shows the coupling of a transformer 2k to a further rectifying bridge 21 such as to provide a direct voltage to the energy supplied DC-network, whose negative terminal 2p is earthed 2q and whose positive terminal 2r is intended to supply its DC-network and its array of one or more co-ordinated batteries (not shown) with a 54V DC for instance.

DESCRIPTION OF EMBODIMENTS AT PRESENT PROPOSED ACCORDING TO FIGS. 3 THROUGH 7

It is pointed out initially that we have chosen to use in the following description of embodiments at present preferred and including characteristic features significant of the present invention and illustrated in the figures of the accompanying drawings, special terms and terminology with the primary intention of illustrating the inventive concept more clearly.

It will be noted, however, that the expressions chosen here shall not be seen as limited solely to the chosen terms used in the description, but that each term chosen shall be interpreted as also including all technical equivalents that function in the same or at least essentially the same way so as to achieve or essentially achieve the same purpose and/or technical effect.

Figure 3:
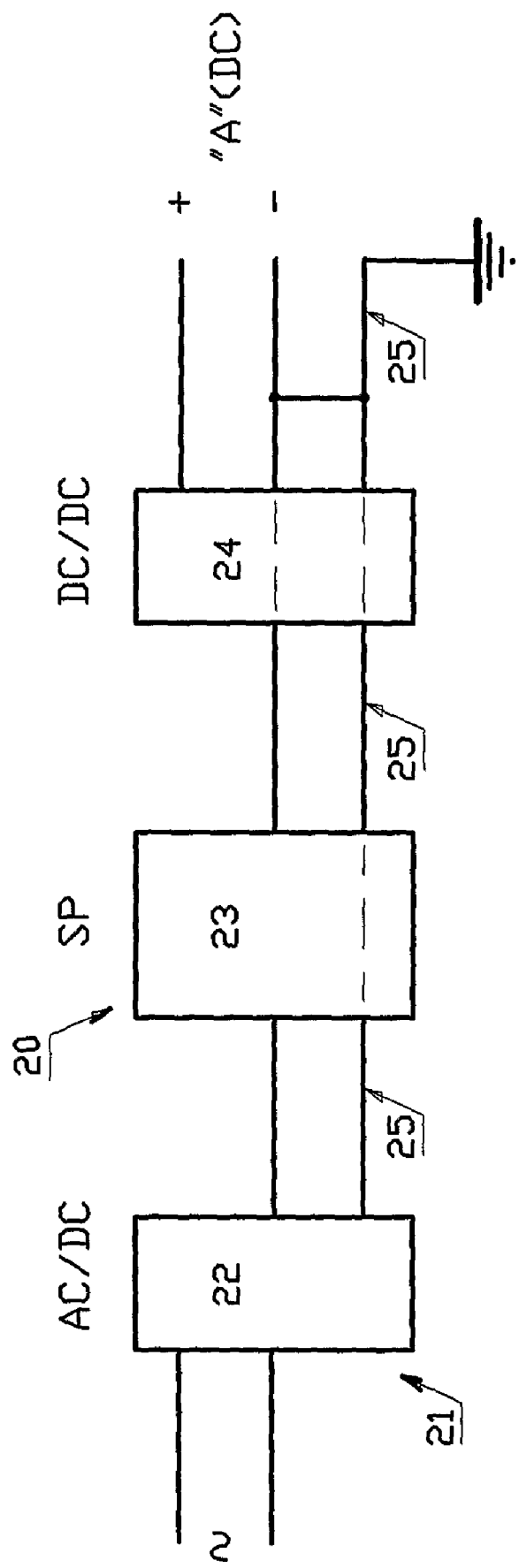
FIG. 3 is a block diagram of a first exemplifying embodiment of the inventive circuit arrangement, with an AC/DC-converter as an energy distributing bridge coupling.

Accordingly, FIG. 3 is a block diagram which illustrates a first exemplifying embodiment of the inventive circuit arrangement 20, having an AC/DC-converter 21 as an energy supplying bridge coupling 22.

Figure 4:
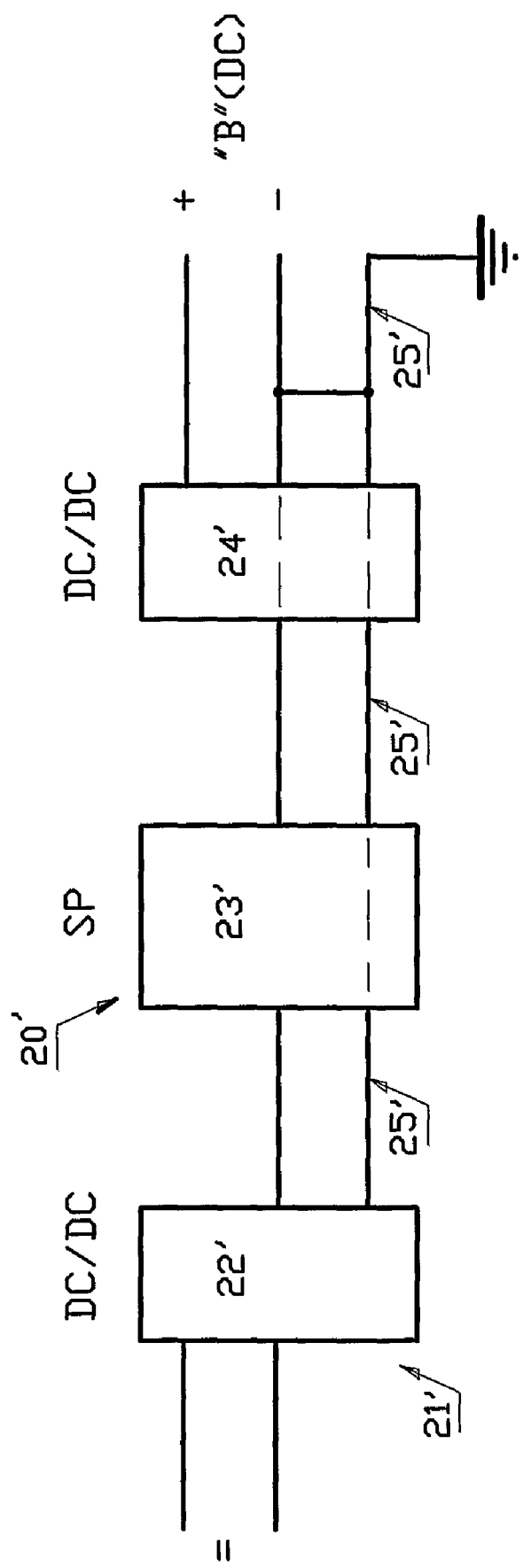
FIG. 4 is a block schematic of the first exemplifying embodiment of the inventive circuit arrangement, with a DC/DC-converter as an energy distributing bridge coupling.

FIG. 4 is a block diagram that illustrates a second exemplifying embodiment of the inventive circuit arrangement with a DC/DC-converter 21' as an energy supplying bridge coupling 22'.

The circuit arrangements 20, 20' include an SP-unit 23, 23' and a DC/DC-converter 24, 24', which then form the DC networks "A" (DC) and "B" (DC).

FIGS. 3 and 4 also show the presence of a continuous conductor or conductor means 25, 25' which extends from the converter or the bridge coupling 22, 22', via the SP-unit 23, 23' and the DC/DC-converter 24, 24', such as to be connect with a reference point, in this case with the negative conductor (−) of the DC-network.

This provides a circuit arrangement 20, 20' that can be coupled in parallel via non-circuit or electrically insulated arrangements 20, 20' (such as the transformer 2k in FIG. 2) by the general use of only one single conductor 25 or 25'

The accompanying FIGS. 5, 6 and 7 thus illustrate schematically and in detail the fundamental concepts of the present invention, where the significant properties of the invention have been concretized by the proposed embodiment, described more specifically below.

Figure 5:
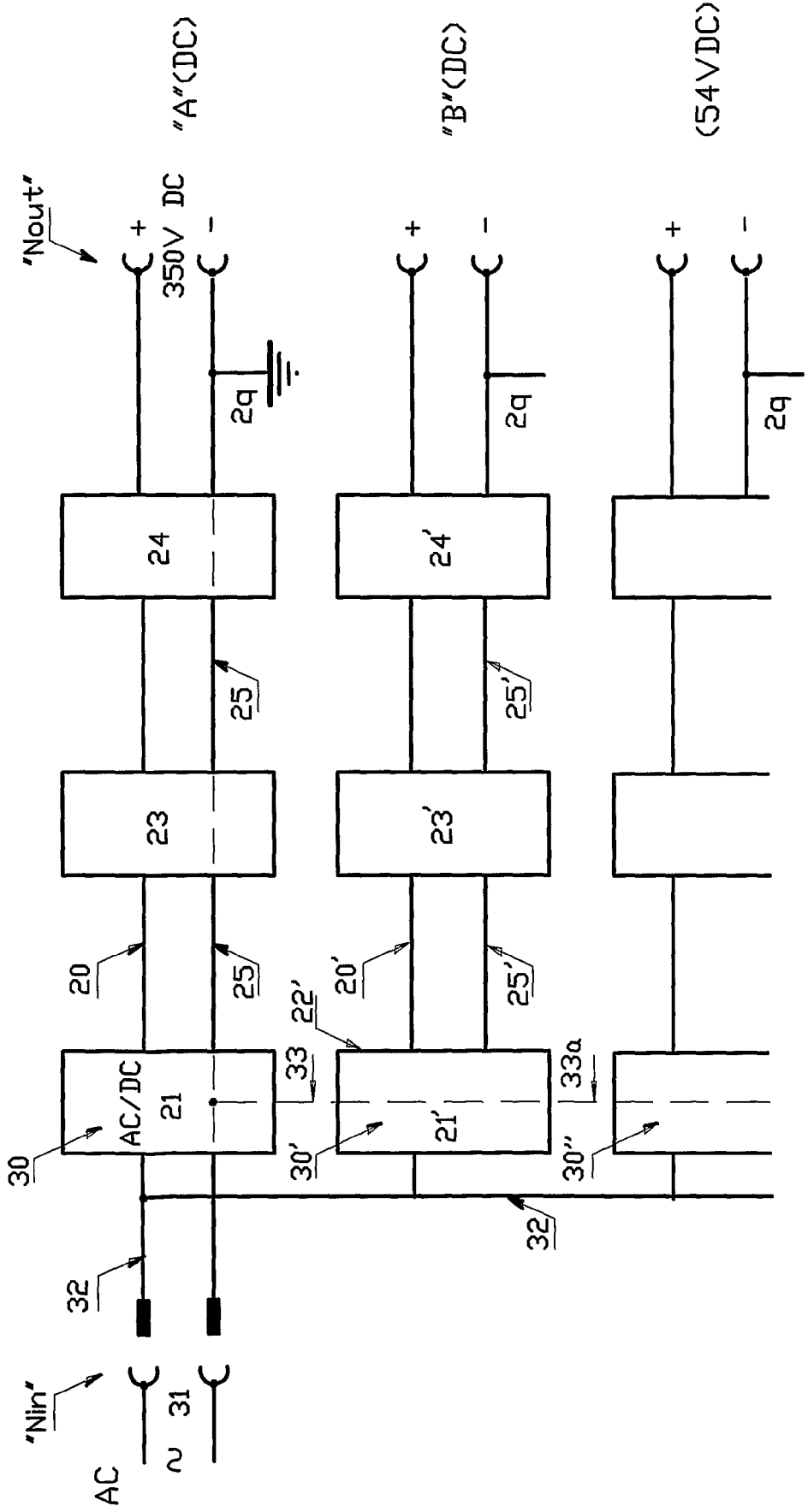
FIG. 5 is a simplified circuit diagram of a plurality of energy supplied DC-networks with a current distributing circuit arrangement and/or a battery charging circuit arrangement, in accordance with the present invention, where the individual units are adapted to be able to supply in parallel a plurality of arrays of co-ordinated energy supplied DC-networks, with a coordination of associated setup-related circuits.

Similar to FIG. 1, FIG. 5 illustrates the principle coupling of a number of circuit arrangements and/or charging circuits 30, 30', 30" to one another, in accordance with the present invention, with associated AC/DC-converter 21, 21', SP-unit 23, 23' and DC/DC-converter 24, 24'. The circuit arrangement 30 and also the remaining parallel-coupled circuit arrangements 30' and 30" may be different although the principle construction with different components is the same. Thus, FIG. 5 illustrates in respect of the first circuit 30, a first rectifying bridge 21, 22 supplied with alternating current, an after-coupling SP-unit 23 and a DC/DC-converter 24, these circuits being mutually series connected to form the DC-network, "A" (DC).

In accordance with the invention there is now proposed the possibility of utilizing a second circuit 30', which is also allotted an AC-supplied bridge coupling 22' having a rectifying bridge 21', an after-coupled SP-unit 23' and a DC/DC-converter 24' to form a DC-network, a "B" (DC network).

FIG. 5 illustrates the use of an energy distributing network, designated "Nin", wherewith this network may be an AC-network 31 or a DC-network which is connected up instead of the rectifying units 21, 21'.

FIG. 5 also illustrates the use of one of several available energy supplied networks "Nout", which are comprised of respective DC-networks having a voltage of 350V DC and designated "A" (DC) and "B" (DC).

In accordance with the present invention it is shown that an alternating current 31, from an energy distributing AC-network is supplied to the circuit arrangement 30, and it will be seen from FIG. 5 that an AC-carrying conductor 32 is connected in parallel with the bridge couplings 32, 32' for each of the circuits 30, 30', 30" related to the setup.

FIG. 5 shows that a conductor 33 (25) and a conductor 33a (25"), and all circuits 20, 20' are mutually connected and coupled to a conductor 25, 25' that constitute an earth system (system potential) here identified by the reference sign 2q.

It is now proposed in accordance with the invention, that a conductor 25 related to system earth 2q required for one circuit 20 (30) with the circuits 21, connected electrically to a conductor 25' which is also related to earth system 2q and which is required for the other circuit 20' (30') with the circuits 21', 23' and 24'.

Figure 6:
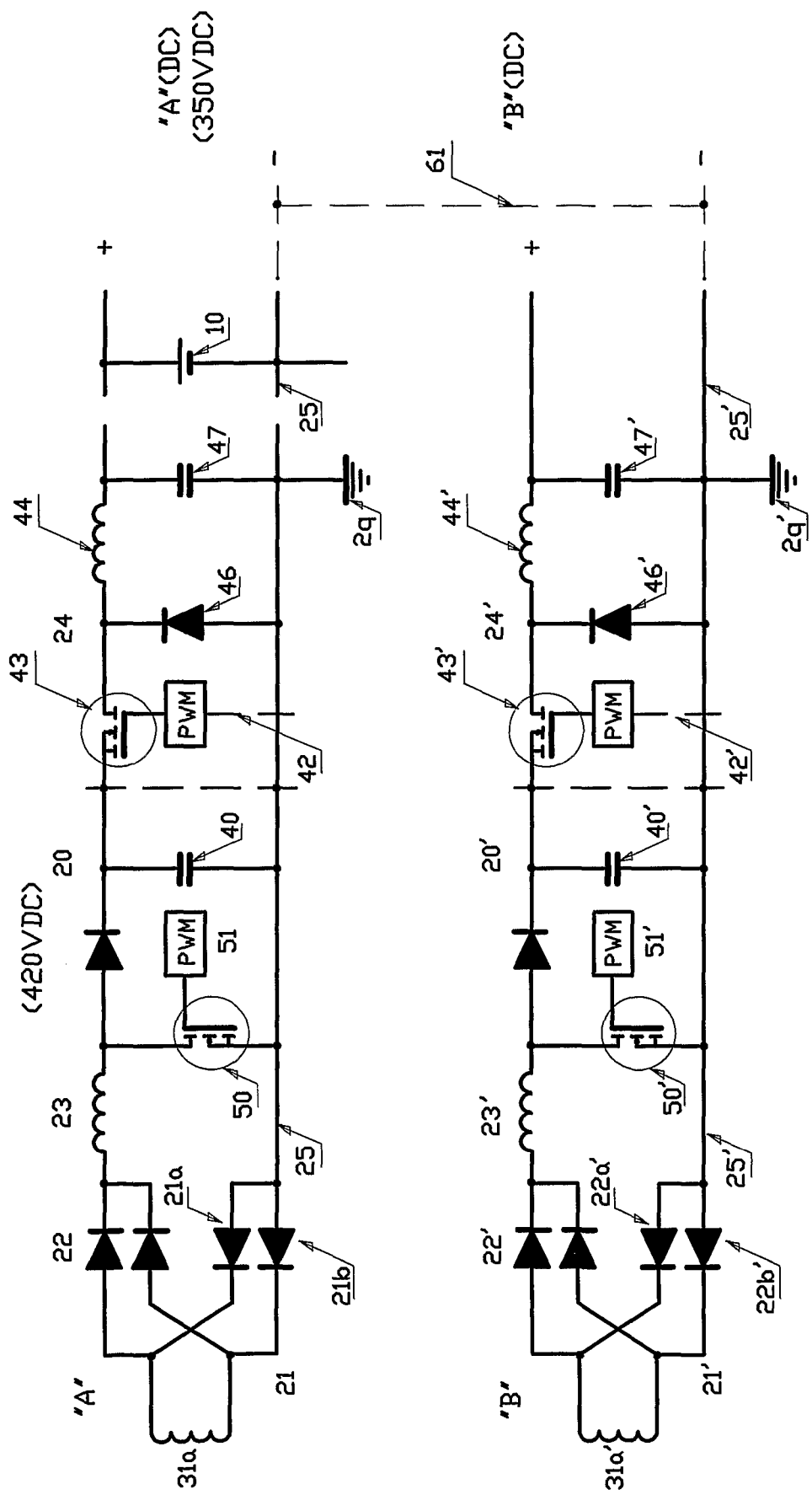
FIG. 6 is a more detailed circuit diagram (A) of a first current distributing circuit arrangement that includes features significant to the present invention, including the coupling of a capacitor, and a similar circuit diagram (B) of a second current distributing arrangement.

According to the invention, earth system 2q and respective conductors 25, 25' according to FIGS. 6A and 6B shall also be connected electrically through the AC-supplying rectifying bridge 22, 22' for the bridge coupling 21, 21', this coupling being shown clearly in FIG. 6 where the conductor 25 is connected to co-ordinated diodes 21a, 21b and the conductor 25' is connected to coordinated diodes 22a', 22b'.

In accordance with the present invention all of said circuits shall be supplied from one and the same AC-supply source 31, whereby all circuits, with there AC-supplied rectifying bridges or AC/DC-converters 21, 21', must necessarily be connected up simultaneously.

As indicated in FIG. 5 each of the rectifying bridges or AC/DC-converters 21, 21' of respective circuits 30, 30' included in the rectifying units 21a, 21b and 21a', 21b' respectively are coupled in parallel.

In order to manage the supply of energy to the energy supplied DC-network, "A" (DC) during those times in which there is a voltage reduction and/or a voltage lack, laps or stop, in the energy distributing AC-network 31, it is necessary to store energy at least in an amount that will be required by a maximally loaded energy distributing DC-network, "A" (DC) during these short lapses in supply.

It is known that the requirement of an energy supplied DC-network station can be fulfilled with the aid of different means, by generating a constant voltage to its customer circuit or to its customers.

An energy supplied DC-network "A" (DC) or "B" (DC) with an energy supplied DC-voltage which is held constant is also important in the supply of voltage to every piece of sensitive equipment, such as computers, robot controls and the like and possibly the parallel charging of batteries when wishing to protect against breakdowns in the supply of energy in the event of long stoppages in the supply of electricity.

Voltage dips in an energy distributing AC-network 31 can, for instance, reduce the energy distributing voltage values down to half the peak voltage during a time span of 200 ms for instance.

A non-isolated constant voltage regulating circuit arrangement 30, 30', which can be coupled in parallel and which includes an SP-unit and which is optimized for inclusion in an energy supplying DC-network station for public distribution of DC current for instance has not previously been constructed.

Voltage dips and very short interruptions in the electricity network supply 31 have been found highly disturbing by, inter alia, offices and process industries that make use of and include modern electronic installations.

Practical experiences reveal that voltage dips and short stoppages occur relatively often, whereas longer stoppages are more seldom.

It is thus highly desirable to be able to deliver a constant DC-voltage and allow the effect of voltage dips in the AC-electrical distribution 31 to be bridged over temporarily. For economic reasons there is an interest in the ability to build DC-network stations in the absence of battery arrays while still providing certain over-bridging periods, for instance in respect of brief voltage dips.

It is obvious to one skilled in this art that the use of an adapted capacitor will afford, in many cases, a far less expensive solution than the use of batteries for this particular energy supply requirement.

Among persons, skilled in this art, there is a growing requirement for the construction of circuit arrangements 20, 20' and 30, 30', 30" respectively that can be used universally in an energy supplied DC-network station and that can be coupled in parallel with greater or with smaller distribution systems and to charge batteries within the system when necessary. The circuit arrangements must then be controllable while maintaining the DC-voltage constant up to a maximum current and power and while protecting the circuits against overloads.

The capacitor 40, 40' included in the SP-unit 23, 23' may be given a low capacitance value so as to create conditions for a lower input surge or charging current and a small volumetric size. Such dimensioning, however, will normally require an array of batteries 10 to be connected to the DC-network, "A" (DC), as a back-up-function.

In the case of a DC-network, "B" (DC), according to FIG. 6b, devoid of a battery array, there is required much larger (and more according to FIG. 6a) capacitors 40' with an adapted higher capacitance value or capacitance values and then also of larger volume.

In accordance with the present invention it is no proposed that the capacitance value of the capacitor 40 is particularly adapted.

In this application, according to FIG. 6b, the capacitance value of the capacitor 40 is chosen to be high, therewith creating conditions for a higher charging current and resulting in higher energy storage.

If the capacitance value is chosen to be still higher, there are created conditions for a higher charging current and for a still higher energy storage facility.

It is also proposed, in accordance with the invention that the energy storage facility shall be so high that the energy, supplied to DC-network "A" (DC) and/or "B" (DC), will produce a constant voltage even in the case of voltage dips in the distributing AC-network 31 over a calculated time period.

The energy storage chosen in the capacitor 40, 40' is thus also critical with regard to the invention. An increase in energy storage can also be implemented with the aid of an increasing voltage ($V^2$).

On the one hand, a higher energy storage facility can create conditions which allow deeper and time wise longer voltage dips in the energy distributing network "Nin" 31 to be accepted without causing a variation in the "Nout" DC-voltage of the DC-network.

On the other hand, lower energy storage provides conditions which will allow only smaller and time wise shorter voltage dips to be accepted in the energy distributing network "N in" 31 so as not to vary the "Nout" DC-voltage of the DC network.

Moreover, the value of the capacitor 40, 40' influences the ripple generated by the rectified AC-voltage 31.

A MOSFET-transistor 50, 50' in the SP-unit 23, 23' is controlled for pulse-width modulation via a circuit 51, 51' of known construction.

The SP-unit 23 can be adapted to emit a DC-voltage of 420V DC with a ripple in the order of magnitude of 100 kHz.

This DC-voltage shall now be lowered to 350V DC in the DC/DC-converter 24, 24'.

In accordance with the present invention, the DC/DC-converter 24, 24' shall include a series coupling of a MOSFET-transistor 43, 43', which is controlled by a computer via a line 42, 42', such as to enable the creation of a chosen limitation of the current supplied to the DC-network.

In the case of the embodiment illustrated in FIG. 6a and in FIG. 6b only one MOSFET transistor 43, 43' is series connected with an inductance 44, 44', with a diode 46, 46' and a capacitor 47, 47' connected between the terminals of the DC-network "A" (DC) and "B" (DC) respectively. It will be seen that the transformer 2k and the rectifier bridge 21 have been eliminated together with four computer controlled MOSFET transistors 2i, included in the AC/DC converter.

It will also be seen that when the SP-units 23 and 23' have an enhanced ability, e.g. in a system without batteries, to deliver a constant DC-voltage and power to the DC-network, even during voltage dips caused by very short network interruptions 31 the capacitors 40, 40' included may be allotted a higher voltage and a higher capacitance value so as to be able to bridge voltage dips or very short network interruptions that are reasonable with respect to the capacitors.

An SP-unit 23 and 23' with associated circuit arrangements will always endeavour to generate a constant output voltage. In the case of voltage dips and falling input voltages (Nin) 31 it follows the voltage downwards and strives to eliminate the voltage dips. Depending on dimensions and loads, the arrangement 20, 20' is able to eliminate practically all voltage dips in the electricity distribution system 31, by virtue of its dynamics although falling within a chosen time duration.

The invention requires no special isolation, since the AC-supplied transformer 31a will normally create the isolation required.

According to the invention, as illustrated in FIG. 6, the capacitor 40, 40' shall be allotted its capacitance value and its voltage, where the chosen energy content (half the capacitance value multiplied by the square of the voltage) is adapted to be able to compensate totally for the maximum energy requirement of respective DC-networks over a predetermined time period.

In normal cases this time period need not exceed 200 ms, although it should in practice exceed 50-100 ms. FIG. 7 illustrates the inclusion of a further energy storing circuit arrangement that includes a capacitor 40a and a diode d3, where it is a question of increasing energy storage.

Figure 7:
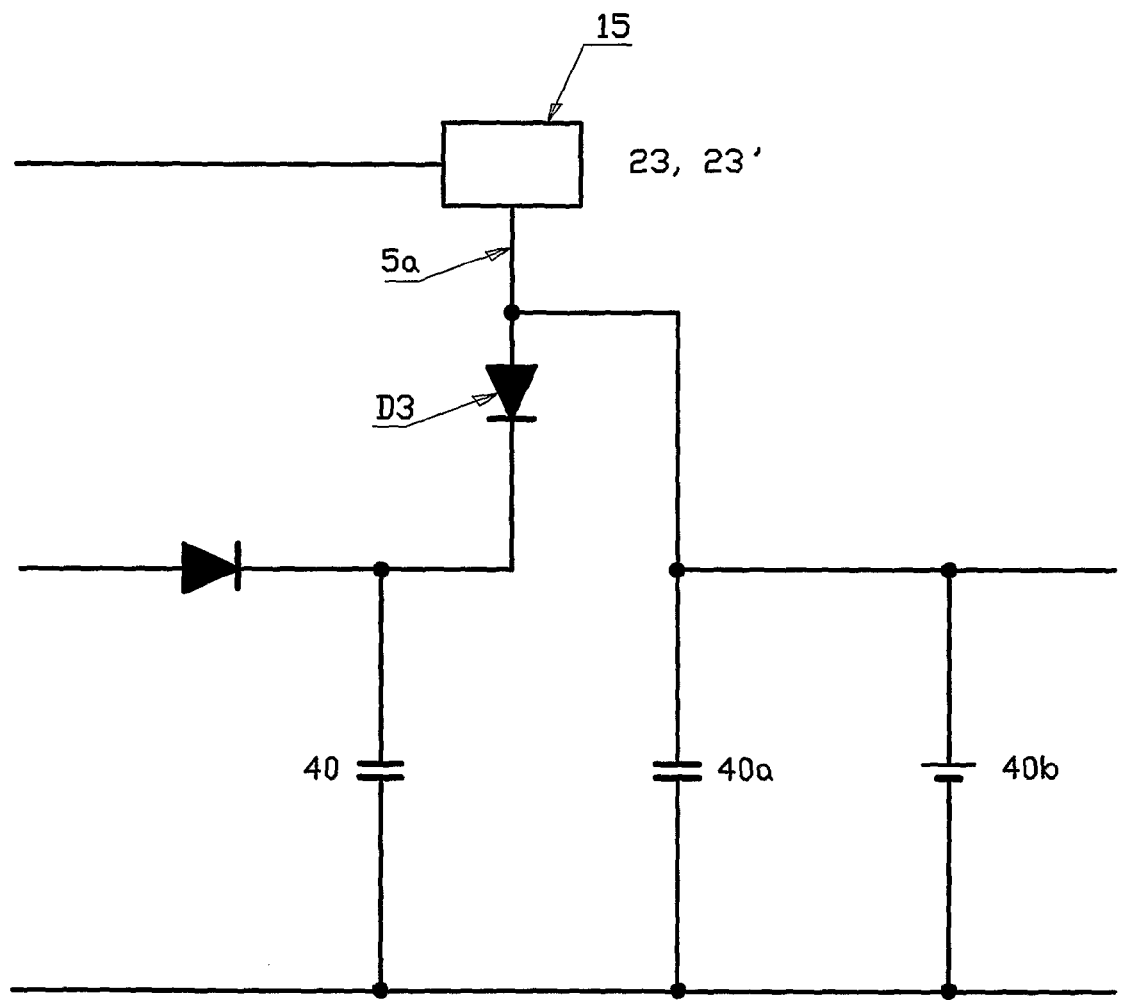
FIG. 7 is a circuit diagram wherein the SP-unit in the circuit has an enhanced energy storage capacity due, inter alia, to the inclusion of a further voltage supplied capacitor.

Also shown in FIG. 7 is a conductor or line 5a which is able to function as a supply of an external additional energy store via a circuit arrangement 15, by virtue of the fact that the conductor 5a can be connected to a back-up-battery that has an energy content sufficiently large to compensate for a significantly larger energy shortfall than that given above.

Thus, a capacitor 40a, a battery 40b or a separate DC-network can be connected to the conductor or line 5a.

The conductor 5a enables the actual SP-unit to be kept at a low inbuilt volume while any further energy requirement can be taken from a circuit placed outside the SP-unit 23, 23'.

This can provide space or room for smaller components in the SP-unit and further space for energy supplying units.

When required this enables simple upgrading of the circuit arrangement via a circuit arrangement that is free from the SP-unit 23, 23', where a temporary voltage drop for the energy distributing AC-network 31 can be accepted far above the time interval of 200 ms, as given above.

The present invention is now based on the principle of allowing the capacitance 40, 40' to be chosen at a high capacitance value and therewith a larger outer volume, where a circuit arrangement (43, 43'; 44, 44'; 46, 46; 47, 47") shall be coupled after the capacitor 40, 40' and adapted for smoothing the DC voltage and the DC current supplied to the DC network.

FIGS. 6a and 6b illustrate an embodiment in which the negative terminals (−) can be coupled together via a broken line conductor without resulting in a dramatic short circuit.

However, more precisely, a diode 21a, 21b, conductive at the time via 50 Hz, in a diode bridge 21 will be common for all corresponding diodes 22a, 22a' in all other parallel-coupled arrangements 20, 20'.

Thus, after the diode bridges 21, 21' and 22, 22' respectively, it is necessary that the negative conductor 25, 25' is unbroken i.e. no components may be coupled in series to this conductor.

All adjustments shall therewith take place using the positive conductor (+), i.e. the control of current and voltage.

The present invention is based on the principle of allowing the capacitance to have a high value and therewith a large outer volume, wherein a circuit arrangement shall be coupled after the capacitor and adapted for smoothing the supplying DC voltage and DC current.

It will be understood that the invention is not restricted to the embodiments given by way of example above, since modifications can be made within the scope of the inventive concept illustrated in the accompanying claims.

It will be noted in particular that each illustrated unit and/or each circuit can be combined with each other illustrated unit and/or circuit within the scope of achieving the desired technical function.

The invention claimed is:

1. A current distributing circuit arrangement, connected to an energy distributing network, with which there is co-ordinated an alternating current-supplied or direct current supplied bridge coupling, an after-coupled and in series coupled sinus pump unit, or SP-unit, and a DC/DC-converter, adapted to supply an energy to an energy distributing DC-network, assigned to said circuit arrangement, and/or charge one or more arrays of co-ordinated batteries assigned to said DC-network, wherein said circuit arrangement, with its DC/DC-converter, is adapted for a pre-selected load setup including, inter alia, its allotted DC-voltage, its allotted capacity and/or its allotted loading current, characterized in that there is connected to said bridge coupling an electric conductor (25) or conductor means which, in the absence of a series coupling and/or a parallel coupling of one or more discrete components in said SP-unit and said DC/DC-converter, is adapted to extend to and is included, as one of the conductors, in said DC-network; and in that said conductor is further connected directly to a reference point, such as an earthing point (2q), wherein the current distributing circuit arrangement is configured to be coupled in parallel to independently performing outputs, wherein the circuit arrangement comprises at least one compensating capacitor configured to provide compensating energy required during short voltage dips, wherein the compensating capacitor is allotted a capacitance value which corresponds to an energy content operable to compensate for a maximum energy requirement of the DC-network over a predetermined duration of time.

2. An arrangement according to claim 1, characterized in that a bridge coupling supplied with an alternating current, is including in a rectifying bridge and co-ordinated diodes are connected directly to said electric conductor or conductor means.

3. An arrangement according to claim 1, characterized in that said SP-unit includes capacitors that are dimensioned for an energy content that is sufficiently large to compensate energy required during short voltage dips and/or briefly occurring voltage breaks occurring in the energy distributing network connected to said bridge coupling, for the purpose of maintaining a chosen DC-level with respect to the connected energy supplied or distributed DC-network.

4. An arrangement according to claim 1, characterized in that the DC/DC-converter includes a controllable transistor coupling, at least one diode and one inductance, connected in series with a transistor included in the transistor coupling.

5. An arrangement according to claim 1, wherein the predetermined duration of time is selected to be a time duration of up to 200 ms.

6. An arrangement according to claim 5, characterized in that the chosen energy content of the capacitor (40) is achieved by a chosen increase in its capacitance value and/or via a chosen voltage increase across the capacitor.

7. An arrangement according to claim 4, characterized in that a DC/DC-converter includes a transistor (43), adapted for pulse-width modulation of a DC-current.

8. An arrangement according to claim 1, characterized in that a first conductor allocated to a first circuit arrangement is related to earth system and coupled electrically to a second conductor allocated to a second circuit arrangement, which is also related to earth system, and in that said earth system is connected directly to a bridge coupling allocated to its circuit arrangement such as to create a parallel coupling function between said first and said second circuit arrangements and a first and second DC-networks allocated to said respective circuit arrangements.

9. An arrangement according to claim 8, characterized in that the circuit arrangements are supplied, in parallel from, to one and the same energy supplying network, such as via an alternating current supply or a direct current supply.

10. An arrangement according to claim 2, characterized in that each of said rectifying units, included in one and the same rectifying bridge for respective circuit arrangements, is dimensioned so that it can be connected in parallel with other units.

11. An arrangement according to claim 1, characterized in that at least one of said DC-network includes one or more battery arrays for maintaining said DC-voltage constant; in that a capacitor included in the SP-unit is allocated a low capacitance value and therewith allows the creation of conditions for a lower current surge or charging current surge and a small volume primarily in order to create conditions, via one or more battery arrays, for compensating for large energy requirements in the DC-network, such as in the case of longer absences of voltage from the energy supplying network.

12. A current distributing circuit arrangement adapted for supplying energy to one or more DC-networks allocated to the circuit arrangement and/or charging one or more arrays of co-ordinated batteries, allocated to one or more of said DC-network, wherein said circuit arrangement includes a current distributing and/or feeding circuit for the supply of energy to said DC-network, said feeding circuit having the form of a DC/DC-converter, that is adapted for a pre-selected load setup, among other things with its allocated terminal voltage, its allocated capacity and/or its allocated loading current, with respective circuit arrangements being allocated a sinus pump unit, SP-unit (3b), and connected in series with said DC/DC-converter, characterized in that the DC/DC-converter includes a computer controlled MOSFET-transistor for regulating current and/or limitation of current to said DC-network (Nout) in a series connection, wherein the current distributing circuit arrangement is configured to be coupled in parallel to independently performing output, wherein the circuit arrangement comprises at least one compensating capacitor configured to provide compensating energy required for short voltage dips, such that the current distributing circuit arrangement provides a generally constant output.

13. An arrangement according to claim 12, characterized in that a number of similar or generally similar circuit arrangements can be connected in parallel and coupled to a reference point, such as an earthing point (a connection point for system earth).

14. An arrangement according to claim 12, characterized in that a single MOSFET-transistor, included in a DC/DC-converter, is connected in series with an inductance (44) related to its DC-network.

* * * * *